Patented Aug. 25, 1953

2,650,151

UNITED STATES PATENT OFFICE 2,650,151

ACRYLONITRILE COPOLYMERS

George E. Ham, Dayton, Ohio, assignor, by mesne assignments, to The Chemstrand Corporation, a corporation of Delaware No Drawing. Application April 22, 1950, Serial No. 157,637

18 Claims. (Cl. 8—55)

1

This invention relates to new copolymers having unusual fiber-forming properties. More specifically the invention relates to acrylonitrile copolymers capable of being converted into dyeable fibers. The invention also relates to dyeable copolymers which can be converted into useful general purpose fibers by conventional fiber-spinning operations.

It is known that copolymers of in excess of 85 per cent acrylonitrile and up to 15 per cent of other monomers have excellent fiber-forming properties. It is further known that by the proper selection of the comonomer, the copolymers and fibers prepared therefrom are made capable of reacting with acid dyestuffs, whereby useful colored products are obtainable. Most of the dyeable acrylonitrile polymers known to the published literature involve the use of comonomeric substances, which are costly and available only in limited quantities. Accordingly, dyeable fibers are prohibitively expensive and non-competitive.

The primary purpose of this invention is to provide a method of preparing fibers of improved dye receptivity. A further purpose is to provide methods of converting acrylonitrile copolymers into dye-receptive polymers by an efficient and economical procedure. A still further purpose is to provide new copolymers of acrylonitrile having unusual properties as are hereinafter described.

It has been found that new and useful copolymers can be obtained by copolymerization of acrylonitrile with allyl glycidyl ether, methallyl glycidyl ether or β-chloroallyl glycidyl ether. The useful polymers are those of 80 to 98 per cent of acrylonitrile and from two to 20 per cent of the unsaturated glycidyl ether. Since the glycidyl ethers may hydrolyze when present in larger proportions in the polymerization reaction vessel, the copolymers of from two to ten per cent have been found to be more useful.

The acrylonitrile-unsaturated glycidyl ether polymers may include small proportions of other monomers interpolymerized therewith, for example vinyl acetate, vinyl chloride, styrene, methacrylonitrile, vinyl pyridine, methyl methacrylate, and diethyl maleate. The quantity of the comonomer present in polymerized form in the acrylonitrile polymer must necessarily be small, since at least 80 percent of acrylonitrile is required to produce fibers with desirable tensile properties, and since at least two percent of the glycidyl ether is required. Accordingly, copolymers of up to 18 per cent of the comonomer, or mixtures of comonomers, are useful.

The new copolymers of acrylonitrile and the glycidyl ethers may be prepared by any polymerization procedure, but the preferred practice utilizes a modified aqueous emulsion polymerization whereby finely divided solid polymers capable of use directly in fiber operations, are obtained. The emulsion polymerization procedure may utilize batch procedures wherein the monomers are charged with an aqueous medium containing the necessary catalyst and dispersion agents. However, the preferred procedure involves a semi-continuous procedure, in which a mixture of monomer is charged to an aqueous medium maintained under conditions necessary to effect polymerization. Obviously, entirely continuous procedures may also be used in which the monomers are gradually introduced to the reactor and the copolymers removed continuously.

The polymerization is catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compound containing a peroxy group (—O—O—). A wide variation in the quantity of peroxy compound is possible. For example, from 0.1 to 3.0 per cent by weight of the polymerizable monomer by be used. The catalyst may be charged at the outset of the reaction, or it may be added continuously, or in increments, throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amine soaps," such as salts of triethanolamine and dodecylmethylamine, salts of rosin acids and mixtures thereof, the water soluble salts of half esters of sulfuric acid and long chain aliphatic alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ration of monomer to water being used, and the conditions of polymerization. In general, however, from 0.01 to one per cent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other means may be successfully employed, for example by rocking or tumbling the reactors. The polymerization equipment generally used is conventional in the art, and the adaptation of a particular type of apparatus to the reaction contemplated is within the province of one skilled in the art.

The optimum polymerizations for fiber formation involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from .001 to two percent on the weight of the monomer to be polymerized.

When the polymerization is complete the polymer is separated from the aqueous medium by any of the conventionally used methods. When the optimum procedures above described are used the polymer may be separated from the aqueous phase by filtration. The resulting polymer in either case may require washing operations to remove traces of soluble catalyst or dispersing agent.

The solid granular copolymers of acrylonitrile and the glycidyl ethers are useful in the preparation of fibers by conventional methods. The preferred practice involves the preparation of spinning solutions by dispersing the polymer in suitable solvents, for example N,N-dimethylacetamide, N,N-dimethylformamide, gamma-butyrolactone and ethylene carbonate. The polymer solutions are fabricated into fibers by extrusion through a suitable die or a spinneret containing a plurality of minute apertures into a medium which removes the solvent and causes the polymer to precipitate into a continuous linear form. The said medium may be liquid, for example water, or aqueous solutions of acids, gases or salts, or it may be a gaseous medium, for example air or any gas which is inert with respect to the polymer.

In order to convert the fibers into a dye receptive form they may be treated with amines or ammonia. To develop optimum dyeability the fibers are then treated with an agent suitable for converting the amino derivative into a quaternary ammonium salt. Suitable amines for effecting the primary conversion are amines which contain at least one active hydrogen. Thus, primary amines, such as methylamine, n-butylamine, aniline or cyclohexylamine, or secondary amines, such as dimethylamine, diethylamine, dibutylamine, N-methylaniline and N-methylcyclohexylamine are suitable. The amine or ammonia derivatives are thereafter reacted with agents suitable for converting the nitrogen into a quaternary ammonium salt form, the quantity required depending upon the number of replaceable hydrogens contained in the basic copolymer. For this reaction reagents, such as chloroacetic acid, methyl chloroacetate, methyl toluenesulfonate, dimethylsulfate, n-butyl bromide, may be used. In general the quaternizing agents may be aliphatic compounds containing halogen substituents or they may be esters of oxygen containing sulfur acids, which acids have ionization constants in excess of $10^{-4}$. Similarly, other agents for converting aliphatic nitrogen atoms into quaternary salts may be used.

The above after-treatment for the purpose of converting the copolymer into dyeable form has been set forth with respect to the treatment of the previously prepared fibers. If desired the polymers may be converted into dyeable form prior to the preparation of the fibers. Thus, the copolymers of acrylonitrile and the various unsaturated glycidyl ethers may be reacted with amines and quaternized in the solid state as obtained from the polymerization reaction. In such cases, however, the reaction preferably involves the use of secondary amines, such as dimethylamine and diethylamine, because the presence of ammonia or primary amines in the spinning solution often results in gelation whereby unspinnable solutions result.

A preferred fiber preparation method involves the dispersion of the untreated copolymer in a suitable solvent, for example N,N-dimethylacetamide, and thereafter treating the spinning solution with secondary amines and quaternizing agents. Here again the use of secondary amines, such as dimethylamine and dibutylamine is required, because the presence of ammonia and primary amines often induces the gelation of the spinning solution.

A further procedure for fiber preparation involves the preliminary preparation of amine-treated fibers and dyeing them in conventional dye baths to which the quaternizing agents have been added. By this procedure the amine treatment may be executed on the solid polymer, in the spinning solution, or on the spun fibers.

An alternative procedure for preparing dyeable copolymers of acrylonitrile and glycidyl ether, involves the preliminary treatment with amines either before or after fiber preparation, and thereafter dyeing them in a dye bath containing thiourea or an alkyl substituted thiourea.

A still further method of converting the new copolymers of acrylonitrile and an unsaturated glycidyl ether involves the use of mercaptobenzothiazole in place of the amines and thereafter treating with quaternizing agents either separately or by their presence in the dye bath.

The reaction by which the allyl glycidyl ether copolymer is converted to a dyeable composition by treatment first with a secondary amine and then with an alkyl halide, is believed to be as follows:

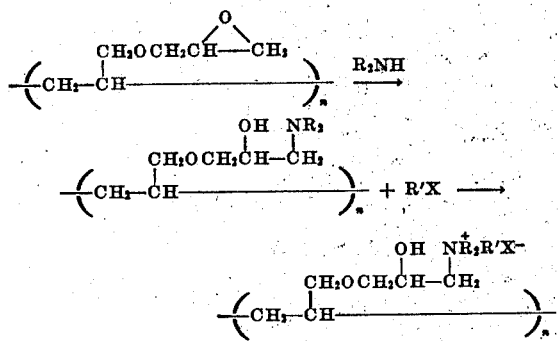

The reaction whereby the allyl glycidyl ether copolymer is converted to a dyeable composition by thiourea treatment is believed to be as follows:

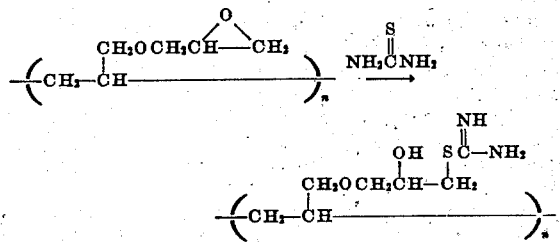

The reaction of the allyl glycidyl ether copolymer with 2-mercaptobenzothiazole followed by reaction with an alkyl halide is believed to be as follows:

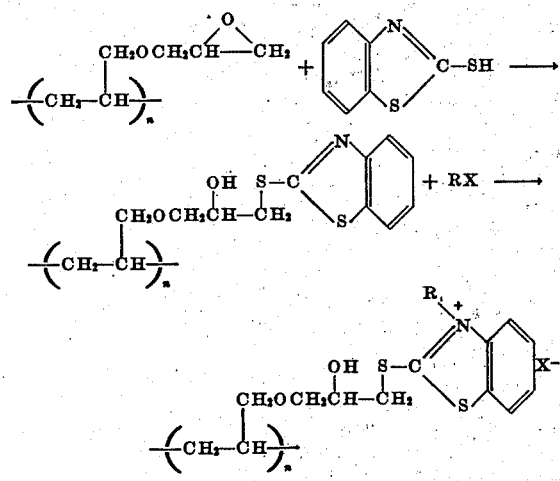

The modified compositions shown above possess the common features of being capable of undergoing anionic exchange with acid dyes.

Further details of the invention are set forth with respect to the following specific examples.

Example 1

A mixture of 92 parts of acrylonitrile and eight parts of allyl glycidyl ether was added continuously to a stirred reaction flask equipped with a reflux condenser, containing 370 parts of distilled water and 0.1 part of a sodium salt of a sulfonated mahogany soap, at 75° C. over a period of 1.5 hours. During the monomer addition a solution of 0.5 part of potassium persulfate in 30 parts of water was added as six increments at equal time intervals. After 0.5 hour reflux the resulting copolymer slurry was steam-distilled to remove unreacted monomer, filtered, washed with water and dried. A yield of 84.2 parts of copolymer of approximately 94 percent acrylonitrile-six percent allyl glycidyl ether was obtained.

A 16 per cent solution of this copolymer in dimethylacetamide was prepared and spun through a 10-hole spinneret (0.005" holes) into a mixture of 60 per cent dimethylacetamide-40 per cent water. The fiber was then passed through a water bath and stretched in a steam tube 330 per cent. The fiber possessed a tenacity of 3.3 grams per denier, elongation of 7-8 per cent, and boil shrinkage of 6.7 per cent.

Example 2

One hundred parts of a 16 per cent solution of the copolymer of Example 1 was treated with eight parts of a 12 per cent dimethylamine solution in dimethylacetamide and heated for six hours at 68° C. To this solution was added 1.08 parts of chloroacetic acid dissolved in two parts of dimethylacetamide and the solution was heated at 68° C. for five hours. Fibers spun from this solution were stretched 4.17 times and possessed a tenacity of 3.2 grams per denier, elongation of seven per cent and a boil shrinkage of 8.6 per cent.

A gram sample of fiber skein was dyed with a solution obtained by mixing one ml. of two per cent Wool Fast Scarlet solution, 5 mls. of three percent sulfuric acid, and 40 mls. of water. After the skein was dyed for four hours at 100° C. a deep scarlet color was produced. The skein had adsorbed 8 mgs. of Wool Fast Scarlet.

Example 3

A 16 percent solution (100 parts) of the copolymer of Example 1 was treated with eight parts of 12 per cent dimethylamine dissolved in dimethylacetamide and heated for five hours at 68° C. Chloroacetic acid was added as in Example 2, and the solution was immediately spun. After the fiber was stretched 3.3 times it was found to possess a tenacity of 2.4 grams per denier and an elongation of eight per cent. This sample was rendered readily dyeable by the addition of an equal weight of chloroacetic acid to the dyebath.

Example 4

Copolymerization of a mixture of 88 parts of acrylonitrile and twelve parts of allyl glycidyl ether as in Example 1, β produced a copolymer of approximately 92 per cent acrylonitrile and eight per cent allyl glycidyl ether in a yield of 80.4 per cent. On spinning a 17 per cent solution of this resin in dimethylacetamide solution as in Example 1, and stretching 3.16 times, a fiber of a tenacity of 2.2 grams per denier, elongation of 8-9 per cent, and boil shrinkage of 9.2 per cent was obtained. The unmodified fiber could not be dyed with Wool Fast Scarlet.

Example 5

One hundred parts of a 17 per cent solution of the copolymer of Example 4 in dimethylacetamide was prepared and 2.62 grams of diethylamine was added as a 50 per cent solution in dimethylacetamide. After the treated solution was heated for four hours at 68° C., it was spun as in Example 1, and the fiber obtained was stretched 4.97 times. The stretched fiber possessed a tenacity of 3.1 grams per denier, elongation of 9-10 per cent, and boil shrinkage of 10.7 per cent. Though the fiber was not appreciably dyeable per se, the addition of an equal weight of chloroacetic acid to the Wool Fast Scarlet dyebath resulted in the development of a deep scarlet color on the fiber and substantially complete dyebath exhaustion.

*Example 6*

A one gram skein of the copolymer of 92 per cent acrylonitrile-eight per cent allyl glycidyl ether produced as in Example 4, were dyed with a mixture of 1 ml. of two per cent Wool Fast Scarlet, 5 mls. of three per cent sulfuric acid, one gram of thiourea, and 40 mls. of water. A deep scarlet color was produced on the fiber and dyebath exhaustion was obtained within 40 minutes, at 100° C. When thiourea was omitted from the dyebath virtually no dye was absorbed by the fiber. Good dyeing with Acid Green CC Extra Conc. was also obtained when thiourea equal to the fiber weight was added to the dyebath.

*Example 7*

To 100 parts of a 17 percent solution of the copolymer of 92 per cent acrylonitrile and eight per cent allyl glycidyl ether was added a solution of 2.08 parts of mercaptobenzothiazole in four parts of dimethylacetamide with stirring. The solution was heated for five hours at 70° C. and spun as in Example 1. The fiber after stretching 4.55 times was found to possess a tenacity of 2.5 grams per denier, elongation of five per cent, and boil shrinkage of 12 per cent. On dyeing for four hours with Wool Fast Scarlet in the presence of an equal weight of chloroacetic acid, good color development on the fiber was obtained. When the chloroacetic acid was omitted from the dyebath, little dye was adsorbed by the fiber.

*Example 8*

A skein of the copolymer of 92 percent acrylonitrile-eight per cent allyl glycidyl ether was immersed in cyclohexylamine for three minutes at 110° C. The skein was washed with acetone and water and dried. Fairly good dyeing with Wool Fast Scarlet was obtained.

The invention is defined by the following claims.

I claim:

1. A copolymer of at least 80 per cent by weight of acrylonitrile and from two to 20 per cent of a compound of the group consisting of allyl glycidyl ether, methallyl glycidyl ether and β-chloroallyl glycidyl ether.

2. A fiber of a copolymer of 90 to 98 per cent by weight of acrylonitrile and from two to ten per cent of a compound of the group consisting of allyl glycidyl ether, methallyl glycidyl ether and β-chloroallyl glycidyl ether.

3. A copolymer of 80 to 98 per cent by weight of acrylonitrile and from two to 20 per cent of allyl glycidyl ether.

4. A copolymer of 80 to 98 per cent by weight of acrylonitrile and from two to 20 per cent of methallyl glycidyl ether.

5. A copolymer of 80 to 98 per cent by weight of acrylonitrile and from two to 20 per cent of β-chloroallyl glycidyl ether.

6. A fiber of a copolymer of 90 to 98 per cent by weight of acrylonitrile and from two to ten per cent of allyl glycidyl ether.

7. A fiber of a copolymer of 90 to 98 per cent by weight of acrylonitrile and from two to ten per cent of methallyl glycidyl ether.

8. A fiber of a copolymer of 90 to 98 per cent by weight of acrylonitrile and from two to ten per cent of β-chloroallyl glycidyl ether.

9. A dyeable copolymer of 80 to 98 per cent by weight of acrylonitrile and from two to 20 per cent of a compound of the group consisting of allyl glycidyl ether, methallyl glycidyl ether and β-chloroallyl glycidyl ether, said copolymer having been contacted first with a compound of the group consisting of ammonia, primary amines and secondary amines to form amino groups, and thereafter by an agent capable of converting the amino groups into quaternary ammonium salt groups.

10. A dyeable copolymer of 80 to 98 per cent by weight of acrylonitrile and from two to 20 per cent of a compound of the group consisting of allyl glycidyl ether, methallyl glycidyl ether and β-chloroallyl glycidyl ether, said copolymer having been contacted with a secondary amine and thereafter with a compound of the group consisting of aliphatic halogen containing compounds and esters of the oxygen-containing sulfur acids, which acids have ionization constants in excess of $10^{-4}$.

11. A dyeable fiber of a copolymer of 80 to 98 per cent by weight of acrylonitrile and from two to 20 per cent of a compound of the group consisting of allyl glycidyl ether, methallyl glycidyl ether and β-chloroallyl glycidyl ether, said fiber having been contacted with a compound of the group consisting of ammonia, primary amines and secondary amines to form amino groups, and thereafter contacting the fiber with an agent capable of converting the amino groups into quaternary ammonium salt groups.

12. A dyeable fiber of a copolymer of 80 to 98 per cent by weight of acrylonitrile and from two to 20 per cent of a compound of the group consisting of allyl glycidyl ether, methallyl glycidyl ether and β-chloroallyl glycidyl ether, said fiber having been contacted with a compound of the group consisting of thiourea and alkyl substituted thioureas.

13. A colored fiber of a copolymer of 80 to 98 per cent by weight of acrylonitrile and from two to 20 per cent of a compound of the group consisting of allyl glycidyl ether, methallyl glycidyl ether and β-chlorallyl glycidyl ether, said fiber having been dyed with an acid dyestuff in the presence of a compound of the group consisting of thiourea and alkyl substituted thioureas.

14. A method of preparing a dyed fiber, which comprises contacting a fiber of a copolymer of 80 to 98 per cent by weight of acrylonitrile and from two to 20 per cent of a compound of the group consisting of allyl glycidyl ether, methallyl glycidyl ether and β-chloroallyl glycidyl ether, with a compound of the group consisting of primary amines, secondary amines and ammonia, to convert the epoxy group into an amino radical, thereafter contacting the fiber with an agent capable of converting the amino group into a quaternary ammonium salt group, and contacting the fiber with an acid dyestuff.

15. A method of preparing a dyed fiber, which comprises contacting a fiber of a copolymer of 90 to 98 per cent by weight of acrylonitrile and from two to ten per cent of a compound of the group consisting of allyl glycidyl ether, methallyl glycidyl ether and β-chloroallyl glycidyl ether, with a compound of the group consisting of primary amines, secondary amines and ammonia, to convert the epoxy group into an amino radical, thereafter contacting the fiber with an agent capable of converting the amino group into a quaternary ammonium salt group, and contacting the fiber with an acid dyestuff.

16. A method of preparing a dyed fiber, which comprises contacting a fiber of a copolymer of 90 to 98 per cent by weight of acrylonitrile and from two to ten per cent of allyl glycidyl ether, with a compound of the group consisting of primary amines, secondary amines and ammonia, to convert the epoxy group into an amino radical, thereafter contacting the fiber with an agent capable of converting the amino group into a quaternary ammonium salt group, and contacting the fiber with an acid dyestuff.

17. A method of preparing a dyed fiber, which comprises contacting a fiber of a copolymer of 90 to 98 per cent by weight of acrylonitrile and from two to ten per cent of methallyl glycidyl ether, with a compound of the group consisting of primary amines, secondary amines and ammonia, to convert the epoxy group into an amino radical, thereafter contacting the fiber with an agent capable of converting the amino group into a quaternary ammonium salt group, and contacting the fiber with an acid dyestuff.

18. A dyeable fiber of a copolymer of 80 to 98 per cent by weight of acrylonitrile and from 2 to 20 per cent of a compound of the group consisting of allyl glycidyl ether, methallyl glycidyl ether and beta-chloroallyl glycidyl ether, said fiber having been contacted first with mercaptobenzothiazole, and thereafter with an agent capable of converting the heteronitrogen atom of the mercaptobenzothiazole into a quaternary ammonium salt group.

GEORGE E. HAM.

References Cited in the file of this patent
UNITED STATES PATENTS

| Number | Name | Date |
|---|---|---|
| 2,470,324 | Staudinger et al. | May 17, 1949 |